United States Patent
Liu et al.

(10) Patent No.: US 9,461,547 B2
(45) Date of Patent: Oct. 4, 2016

(54) CONVERTER CIRCUITRY

(71) Applicant: Cree, Inc., Durham, NC (US)

(72) Inventors: XueChao Liu, Kowloon (HK); John Mookken, Raleigh, NC (US)

(73) Assignee: Cree, Inc., Durham, NC (US)

( * ) Notice: Subject to any disclaimer, the term of this patent is extended or adjusted under 35 U.S.C. 154(b) by 147 days.

(21) Appl. No.: 14/201,005

(22) Filed: Mar. 7, 2014

(65) Prior Publication Data

US 2015/0256084 A1  Sep. 10, 2015

(51) Int. Cl.
H02M 3/335 (2006.01)
H02M 1/08 (2006.01)
H02M 1/00 (2006.01)

(52) U.S. Cl.
CPC ........... *H02M 3/33507* (2013.01); *H02M 1/08* (2013.01); *H02M 3/3353* (2013.01); *H02M 3/33569* (2013.01); *H02M 2001/0048* (2013.01); *Y02B 70/1433* (2013.01); *Y02B 70/1483* (2013.01)

(58) Field of Classification Search
CPC ......... H02M 3/33507; H02M 3/3353; H02M 3/33569; H02M 1/08; H02M 2001/0048
See application file for complete search history.

(56) References Cited

U.S. PATENT DOCUMENTS

| | | | |
|---|---|---|---|
| 5,132,889 A * | 7/1992 | Hitchcock | H02M 3/337 363/132 |
| 8,477,519 B2 * | 7/2013 | Nakamura | H02M 1/4258 363/126 |
| 2008/0103632 A1 | 5/2008 | Saban et al. | |
| 2008/0316780 A1 | 12/2008 | Saren et al. | |
| 2010/0301826 A1 | 12/2010 | Moussaoui et al. | |
| 2012/0039092 A1 * | 2/2012 | Xu | H02M 3/3376 363/17 |
| 2012/0126728 A1 | 5/2012 | El-Refaie et al. | |
| 2012/0294045 A1 * | 11/2012 | Fornage | H02M 7/217 363/17 |
| 2012/0326646 A1 | 12/2012 | Tanaka et al. | |

(Continued)

FOREIGN PATENT DOCUMENTS

EP  2811638 A1  12/2014
WO  2012090242 A1  7/2012

OTHER PUBLICATIONS

International Search Report and Written Opinion for International Patent Application No. PCT/US2015/018741, mailed Jun. 3, 2015, 11 pages.

(Continued)

*Primary Examiner* — Matthew Nguyen
(74) *Attorney, Agent, or Firm* — Anthony J. Josephson

(57) ABSTRACT

Disclosed is a DC-DC converter with a converter bridge, tank circuitry, and rectifier circuitry. In one embodiment, the converter bridge includes multiple switch circuits, which are formed with silicon carbide MOSFETs (metal on semiconductor field effect transistors), and are configured to provide a primary current. The tank circuitry includes a resonant capacitance, a resonant inductance, and a transformer with a primary, a first secondary, and a second secondary. The tank circuitry is configured to receive the primary current, and the transformer is associated with a magnetizing inductance. The resonant frequency of the tank circuitry is greater than about 225 kilohertz as essentially defined by the magnetizing inductance, the resonant capacitance, and the resonant inductance. The rectifier circuitry is coupled to the first secondary and the second secondary coil, and is adapted to provide a rectified output current.

25 Claims, 15 Drawing Sheets

(56) References Cited

U.S. PATENT DOCUMENTS

| | | |
|---|---|---|
| 2013/0002215 A1 | 1/2013 | Ikeda et al. |
| 2013/0063184 A1 | 3/2013 | Liang et al. |
| 2014/0104901 A1 | 4/2014 | Nguyen |
| 2014/0355313 A1 | 12/2014 | Nishikawa |
| 2015/0055374 A1* | 2/2015 | Yamashita ............ H02M 3/337 363/17 |
| 2015/0098250 A1* | 4/2015 | Wu ................... H02M 3/33507 363/17 |
| 2015/0249384 A1 | 9/2015 | Liu et al. |

OTHER PUBLICATIONS

Burkart, Ralph M. et al., "Comparative Evaluation of SiC and Si PV Inverter Systems Based on Power Density and Efficiency as Indicators of Initial Cost and Operating Revenue," 2013 IEEE 14th Workshop on Control and Modeling for Power Electronics (COMPEL), Jun. 23-26, 2013, IEEE, 6 pages.

Deboy, Gerald et al., "New SiC JFET Boost Performance of Solar Inverters," Power Electronics Europe, Issue 4, 2011, Access Intelligence, pp. 29-33.

International Search Report and Written Opinion for International Patent Application No. PCT/US2015/017529, mailed Jun. 25, 2015, 20 pages.

Liu, Jimmy et al., "Performance Evaluations of Hard-Switching Interleaved DC/DC Boost Converter with New Generation Silicon Carbide MOSFETs," Aug. 6, 2013, http://www.cree.com/~/media/Files/Cree/Power/Articles%20and%20Papers/Power_Article_4.pdf, Cree, Inc., 6 pages.

Non-Final Office Action for U.S. Appl. No. 14/193,842, mailed Jun. 29, 2016, 18 pages.

* cited by examiner

CONVERTER CIRCUITRY

FIELD OF THE DISCLOSURE

The present disclosure relates to converter circuitry.

BACKGROUND

The field of power electronics relates to the control and conversion of electric power. Since power may be provided and used in either direct current (DC) or alternating current (AC) formats and at differing voltage or current levels, there is a continuing need for more efficient and cost effective DC-DC converters, AC-DC converters, AC-AC converters, and DC-AC inverters. For many AC-DC, AC-AC, and DC-AC converters and inverters, a DC-DC converter is a core element in the overall system. These devices are used in electric vehicle chargers, telecom power supplies, industrial power supplies, and alternative energy conversion devices.

SUMMARY

Disclosed is a DC-DC converter with a converter bridge, tank circuitry, and rectifier circuitry. In one embodiment, the converter bridge includes multiple switch circuits, which are formed with high voltage silicon carbide MOSFETs (metal-oxide-semiconductor field-effect transistors), and are configured to provide a primary current. The tank circuitry includes a resonant capacitance, a resonant inductance, and a transformer with a primary, a first secondary, and a second secondary. The tank circuitry is configured to receive the primary current, and the transformer is associated with a magnetizing inductance. The resonant frequency of the tank circuitry is greater than about 225 kilohertz as essentially defined by the magnetizing inductance, the resonant capacitance, and the resonant inductance. The rectifier circuitry is coupled to the first secondary and the second secondary, and is adapted to provide a rectified output current.

The converter bridge may use a 2-level architecture that provides zero voltage switching (ZVS) and operates at high power levels. For example, the output power provided by the DC-DC converter may be between about five kilowatts and 20 kilowatts at a high input voltage of between about 650 and 850 volts or higher. Efficiency of the DC-DC converter may be between about 97.5% and 99.0% or higher. The DC-DC converter may have a power density between about 35 and 45 watts per cubic inch, even in air-cooled embodiments that employ a fan and associated fan circuitry.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
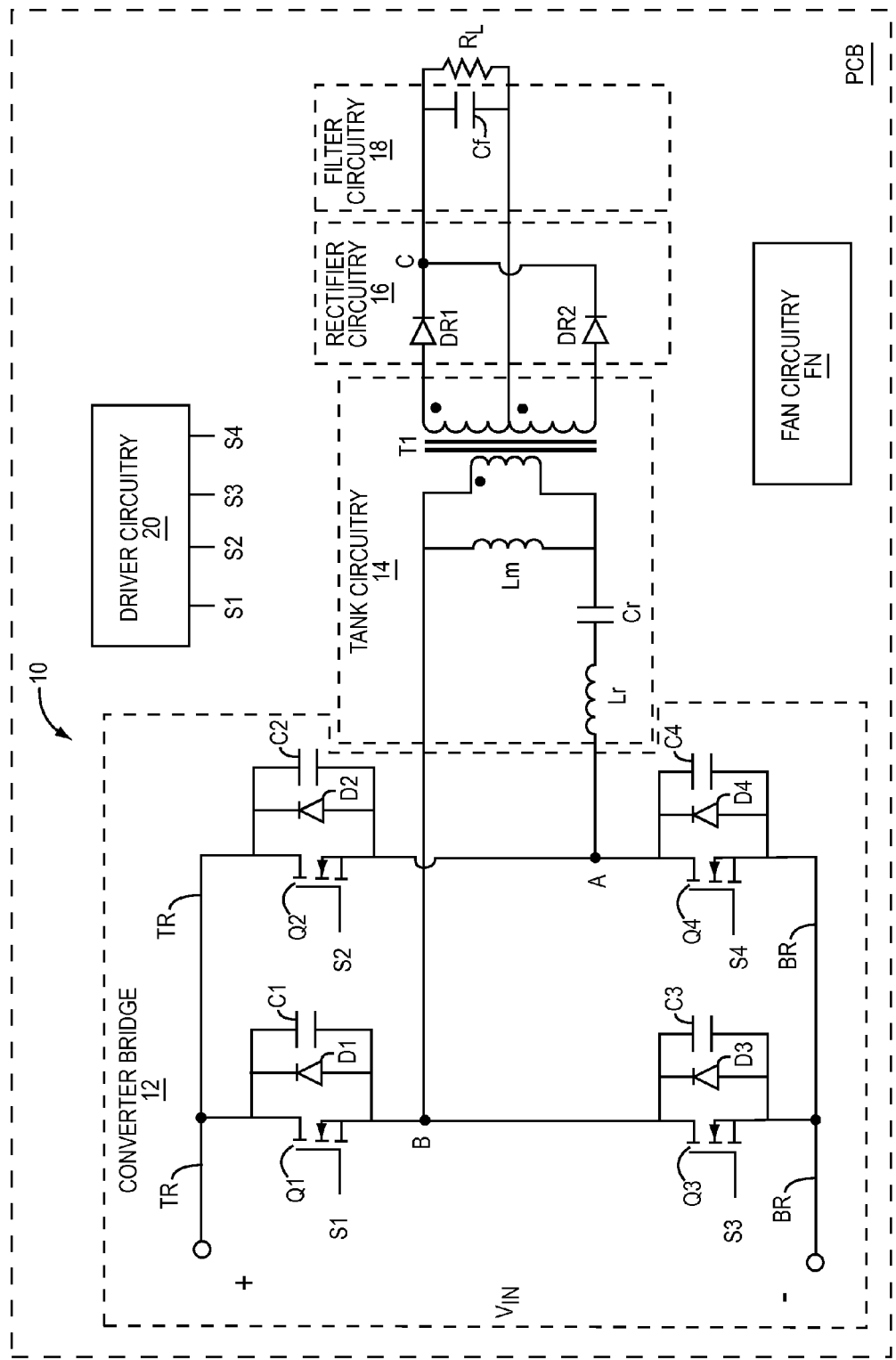
FIG. 1 is a schematic diagram of an exemplary ZVS converter according to a first embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

With reference to FIG. 1, a full H-bridge, ZVS resonant converter design, which is referred to as a zero voltage switching (ZVS) converter 10, is illustrated. The ZVS converter 10 is a two-level architecture and includes a converter bridge 12, a tank circuitry 14, rectifier circuitry 16, filter circuitry 18, and driver circuitry 20. The ZVS converter 10 is configured to drive a load $R_L$. While the converter bridge 12 is shown as a full H-bridge configuration, those skilled in the art will recognize alternative converter structures. The converter bridge 12 includes four switch circuits, which are implemented with four, 1200V N-channel silicon carbide metal-oxide-semiconductor field-effect transistors (MOSFETs) Q1-Q4. While other material systems, such as gallium nitride (GaN), and transistor types, such as junction field effect transistors (JFETs), may be employed, performance is optimized at this time using silicon carbide MOSFETs. Exemplary MOSFETs include Cree, Inc.'s model number C2M0160120D power MOSFETs. All of the electronics above as well as fan circuitry FN may be provided on a single printed circuit board PCB. The fan circuitry FN includes a fan and related control circuitry to provide forced-air cooling for the electronics of the ZVS converter 10.

Each of the transistors Q1-Q4 has an integrated body diode D1-D4. While the transistors Q1-Q4 have parasitic drain-to-source capacitance, additional capacitors C1-C4 are provided across the drains and sources of the respective transistors Q1-Q4. The transistors Q1-Q4 are arranged as described in the following. Transistors Q1 and Q3 are coupled in series between a top rail TR and a bottom rail BR to form a first switch leg, and transistors Q2 and Q4 are coupled between the top rail TR and the bottom rail BR to form a second switch leg. The second switch leg provides a node A between transistors Q2 and Q4, and the first switch leg provides a node B between transistors Q1 and Q3. The body diodes D1-D4 are effectively coupled in anti-parallel across the respective transistors Q1-Q4.

For the tank circuitry 14, the primary coil of a transformer T1 is coupled across nodes A and B. The transformer T1 is illustrated as a non-ideal transformer, and as such, depicts a magnetizing inductance Lm in parallel with the primary coil of the transformer T1. An additional resonant inductor Lr and a resonant capacitor Cr are coupled in series between node A and the primary coil of the transformer T1.

The secondary coil of the transformer T1 is center-tapped to provide upper and lower coils. A filter capacitor Cf in the filter circuitry 18 and the load $R_L$ are shown coupled in parallel with one another across the upper coil. A diode DR1 is coupled in series with the load $R_L$, and in particular, between an upper terminal of the upper coil and a first terminal of the load $R_L$. The anode of the diode DR1 is coupled to the upper terminal of the upper coil, while the cathode is coupled to the first terminal of the load $R_L$. The center tap of the transformer T1 is coupled to the second terminal of the load $R_L$. A diode DR2 is coupled between the bottom terminal of the lower coil of the transformer T1 and a node C between the cathode of the diode DR1 and the first terminal of the load $R_L$. In particular, the anode of the diode DR2 is coupled to the bottom terminal of the lower coil of the transformer T1, and the cathode of the diode DR2 is coupled to Node C. The arrangement of the diodes DR1, DR2 represents the rectifier circuitry 16. Diodes DR1, DR2 may, but need not, match the material system of the transistors Q1-Q4. Exemplary silicon carbide diodes for diodes DR1, DR2 are Cree Inc.'s model number C3D16060D diodes.

The gates of the transistors Q1-Q4 are respectively driven by control signals S1-S4, which are provided by driver circuitry 20. While each of the control signals S1-S4 may be independent of the others, in the embodiment disclosed below, control signals S1 and S4 are either identical or represent the same control signal. Similarly, control signals S2 and S3 are either identical or represent the same control signal. As such, transistors Q1 and Q4 are turned on and off at the same time, and transistors Q2 and Q3 are turned on and off at the same time.

Figure 2:
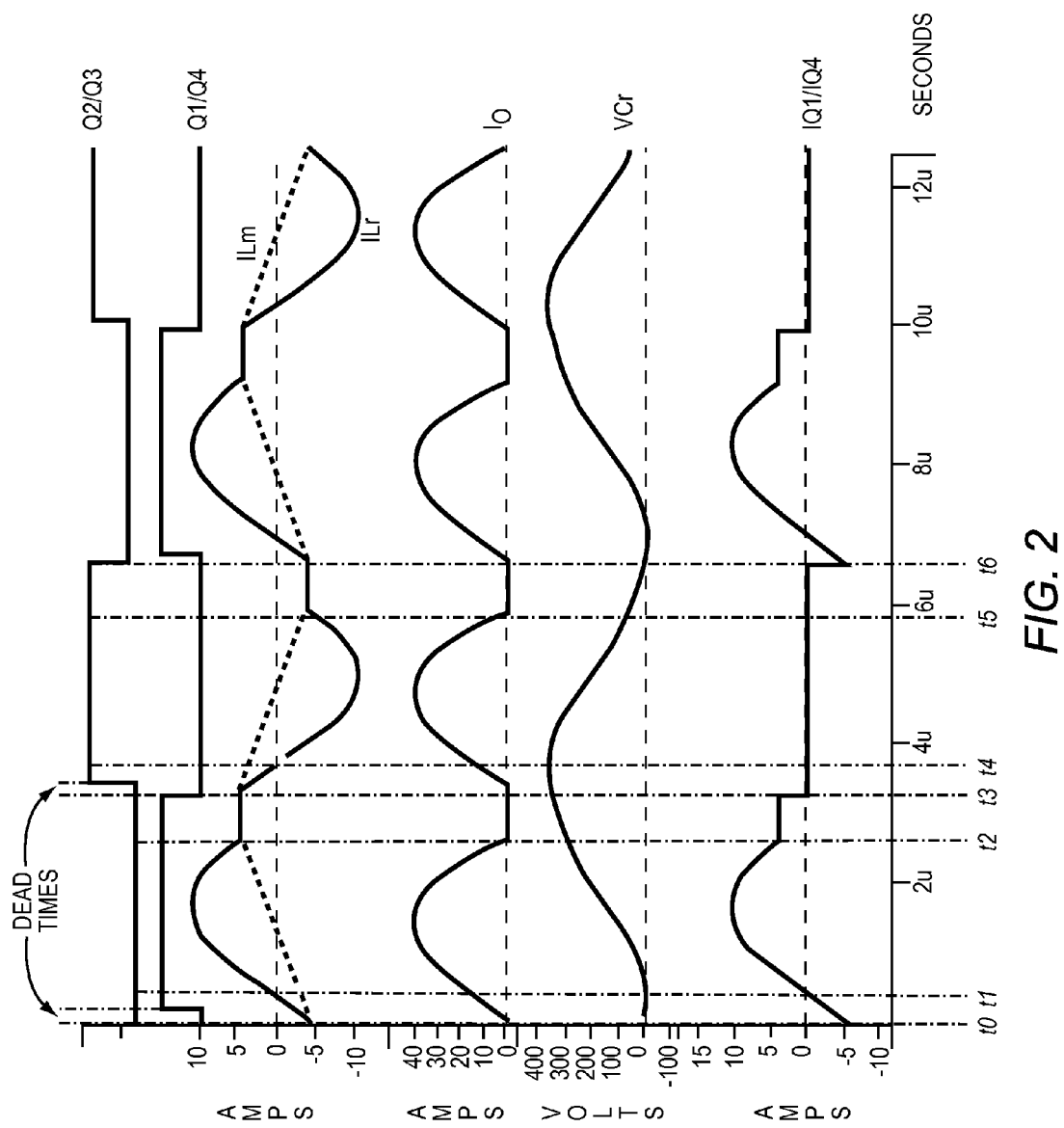
FIG. 2 is a timing diagram for the operation of the ZVS converter of FIG. 1.

Turning now to FIG. 2, a timing diagram is provided to illustrate operation of the ZVS converter 10. In the timing diagram, the signal Q2/Q3 indicates the state of transistors Q2, Q3, and the signal Q1/Q4 indicates the state of transistors Q1, Q4. A logic high indicates that the corresponding transistors Q1-Q4 are on and conducting, while a logic low indicates that the corresponding transistors Q1-Q4 are off and not conducting. The resonant inductor current ILr is the current flowing through the resonant inductor Lr and generally corresponds to a primary current $I_P$ that flows through the ZVS converter 10 on the primary side of the transformer T1. The magnetizing current ILm represents the current flowing through the magnetizing inductance Lm of the transformer T1. The output current $I_O$ represents the secondary current that flows out of node C from either diode DR1 or diode DR2 toward the load $R_L$. The resonant capacitor voltage VCr is the voltage across the resonant capacitor Cr. IQ1/IQ4 is the current flowing through either of transistors Q1, Q4 at any given time.

In general, a full cycle corresponds to the period t0-t6. The period t0-t3 represents the positive half-cycle of the full cycle, while the period t3-t6 represents the corresponding negative half-cycle of the full cycle. As noted, transistors Q1, Q4 are turned on and off together, and transistors Q2, Q3 are turned on and off together. Transistors Q1, Q4 are never on at the same time as transistors Q2, Q3, in the illustrated embodiment.

During the period t0-t2 of the positive half-cycle (t0-t3), the magnitude of the resonant inductor current ILr is greater than the magnetizing current ILm. As such, the top coil of the transformer T1 will provide the output current $I_O$ to the load $R_L$ through the diode DR1. Similarly, during the period t3-t5 of the negative half-cycle (t3-t6), the magnitude of the magnetizing current ILm is greater than the resonant inductor current ILr. As such, the bottom coil of the transformer T1 will provide the output current $I_O$ to the load $R_L$ through diode DR2. In either half-cycle during the positive and negative half-cycles, the output current $I_O$ will also charge the filter capacitor Cf.

When the resonant inductor current ILr and the magnetizing current ILm are the same, such as in period t2-t3 of the positive half-cycle and period t5-t6 of the negative half-cycle, there is no output current $I_O$ provided by either the top or bottom coils of the transformer T1. Neither diode DR1 nor diode DR2 conducts. During these periods, the previously charged filter capacitor Cf provides the current to load $R_L$.

Figure 3A:
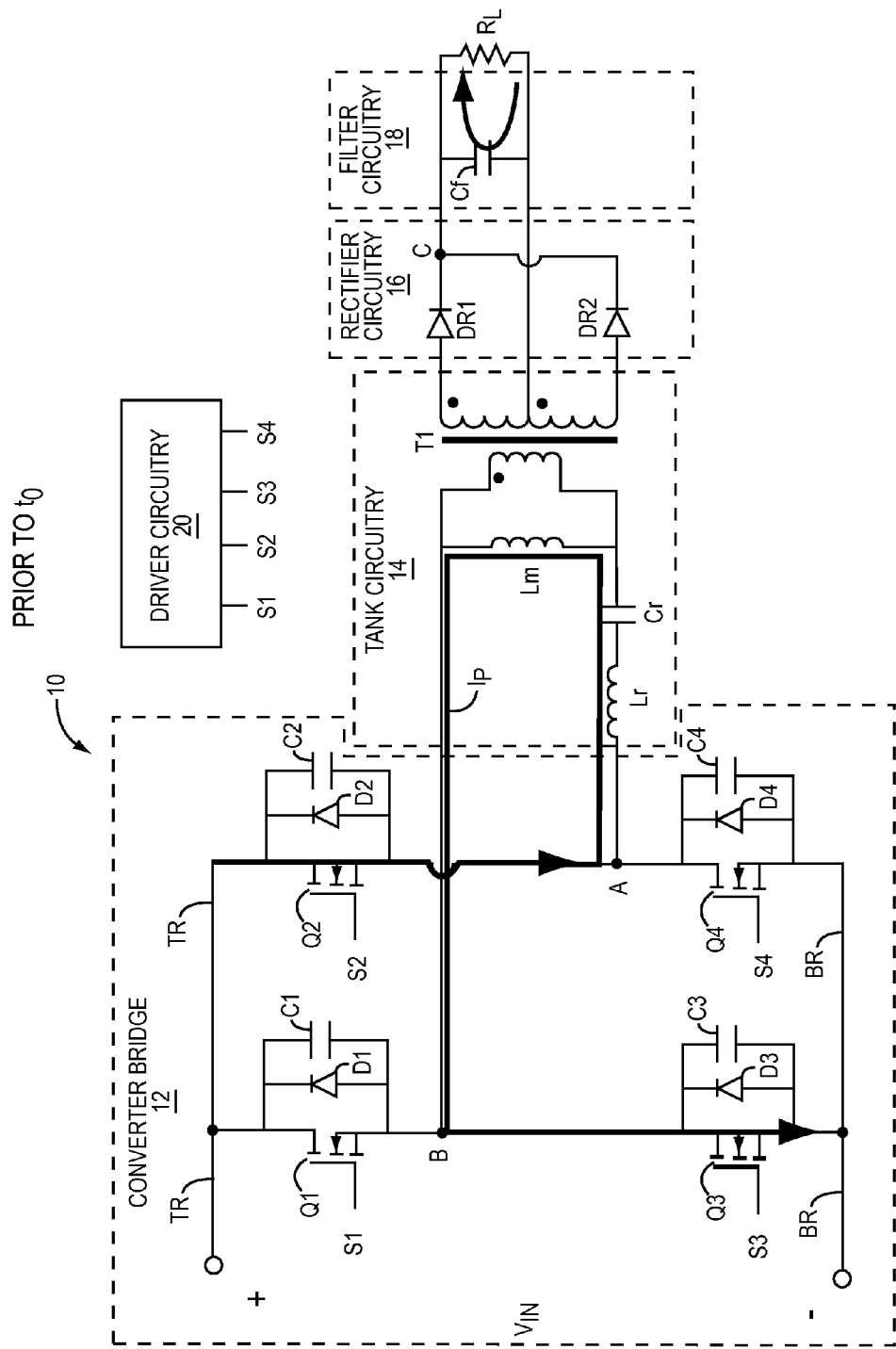
FIGS. 3A through 3I illustrate the current flow through the ZVS converter in light of the timing diagram of FIG. 2.

The following describes the operation of the ZVS converter 10 during the positive half-cycle. Just before time t0 as illustrated in FIG. 3A, transistors Q2, Q3 are on, and transistors Q1, Q4 are off. The primary current $I_P$ extends from the top rail TR to the bottom rail BR through transistor Q2, node A, resonant inductor Lr, resonant capacitor Cr, the magnetizing inductance Lm, node B, and transistor Q3. As such, the resonant inductor current ILr and the magnetizing current ILm are negative, and $I_O$ is zero. The current to the load $R_L$ is provided from the filter capacitor Cf, not from either secondary coil of the transformer T1.

For a very short period at the beginning of period t0-t1, there is a dead time where all of the transistors Q1-Q4 are off. An exemplary dead time period is between about 100 ns and 300 ns. A complementary dead time is provided for the negative half-cycle at the beginning of period t3-t4.

Figure 3B:
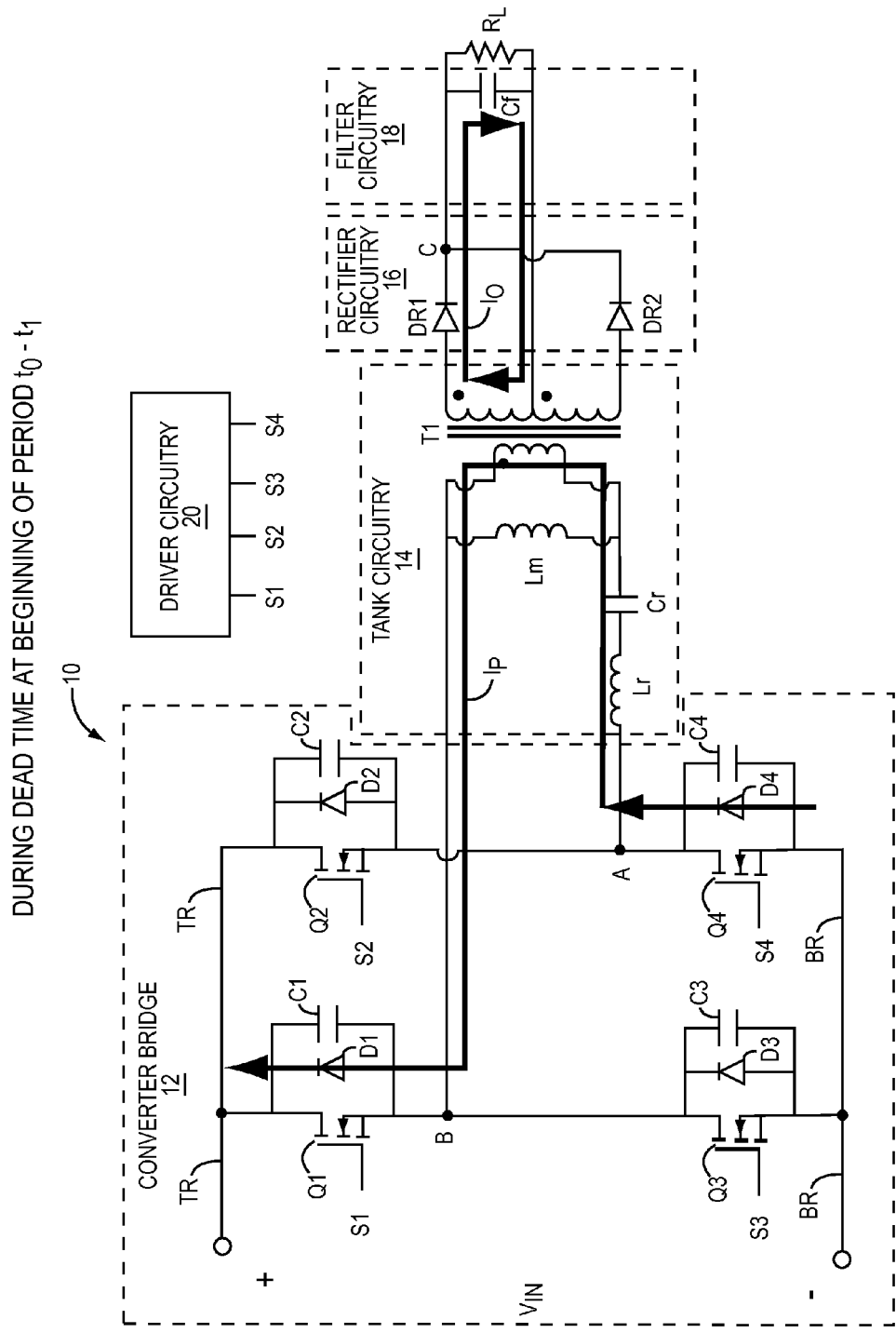

At time t0, transistors Q2, Q3 turn off and transistors Q1, Q4 remain off for a brief period to provide the dead time. When the transistors Q2, Q3 turn off, the resonant current ILm continues to flow; however, the primary current $I_P$ switches to the path shown in FIG. 3B. In particular, the primary current $I_P$ switches to flow from the bottom rail BR to the top rail TR through the body diode D4 of transistor Q4, node A, the resonant inductor Lr, the resonant capacitor Cr, the primary coil of the transformer T1, node B, and body diode D1 of transistor Q1. The resonant inductor Lr and the resonant capacitor Cr are in resonance. The output current $I_O$ begins to flow from the top coil of the transformer T1 through diode DR1 to the load $R_L$, as the resonant inductor current ILr further increases above the magnetizing current ILm.

Figure 3C:
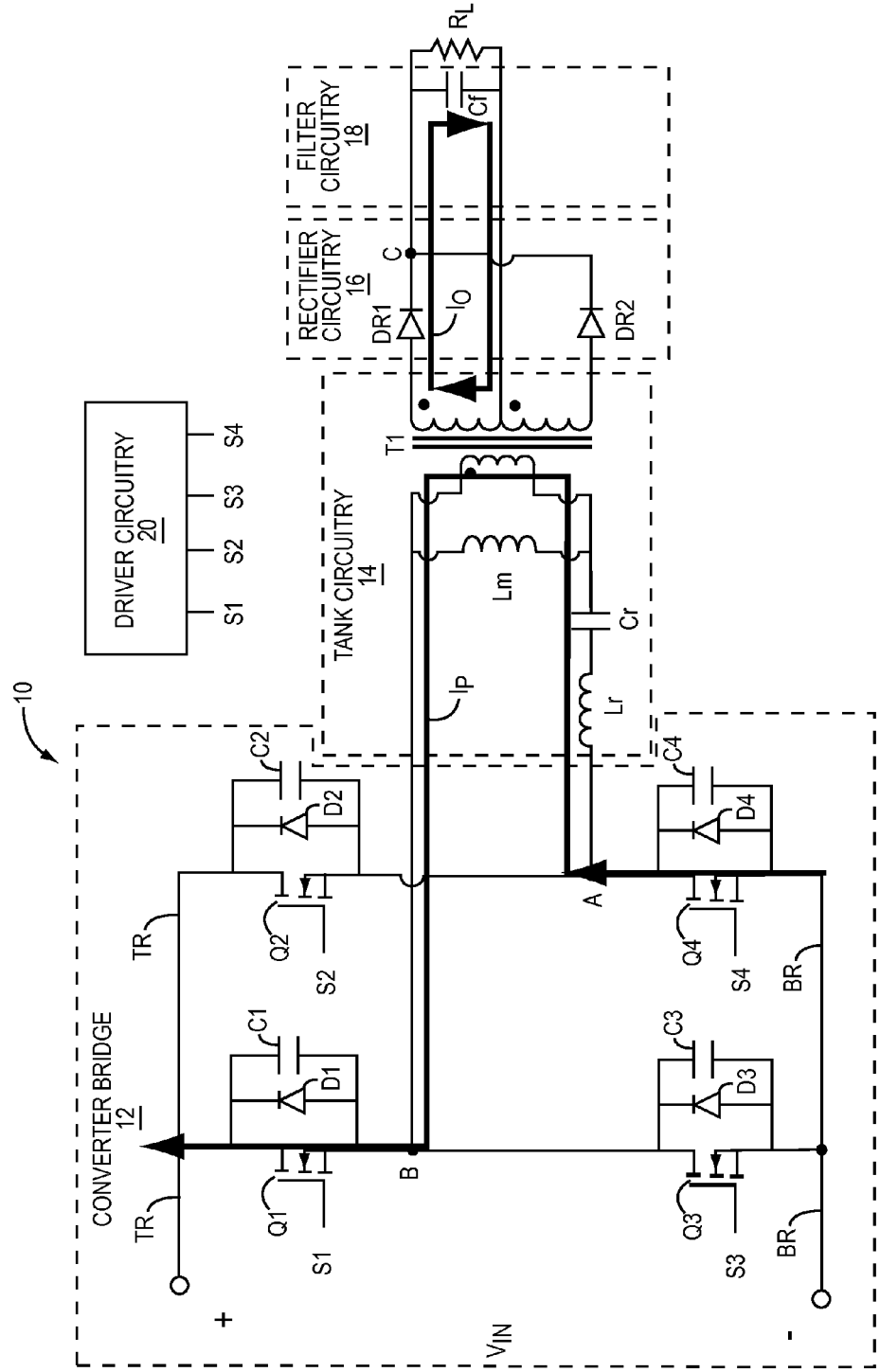

After the brief dead time at the beginning of period t0-t1, transistors Q1, Q4 turn on. Transistors Q2, Q3 remain off. The resonant inductor current ILr continues to flow; however, the path of the primary current $I_P$ changes slightly to that shown in FIG. 3C. The primary current $I_P$ continues to flow from the bottom rail BR to the top rail TR, but no longer flows through the body diode D4 of transistor Q4 and the body diode D1 of transistor Q1. Instead, the primary current $I_P$ switches to the channels of transistors Q4, Q1.

At this point, the primary current $I_F$ is forced to flow in reverse through the channels of the transistors Q1, Q4. Such operation, where current flows in reverse through a MOSFET that is turned on, is referred to as "third quadrant" operation. Accordingly, the primary current $I_P$ flows from the bottom rail BR to the top rail TR through the channel of transistor Q4 (instead of the body diode D4), node A, the resonant inductor Lr, the resonant capacitor Cr, the primary coil of the transformer T1, node B, and the channel of transistor Q1 (instead of the body diode D1). The output current $I_O$ continues to flow from the top coil of the transformer T1 through diode DR1 to the load $R_L$, as long as the resonant inductor current ILr remains above the magnetizing current ILm.

Figure 3D:
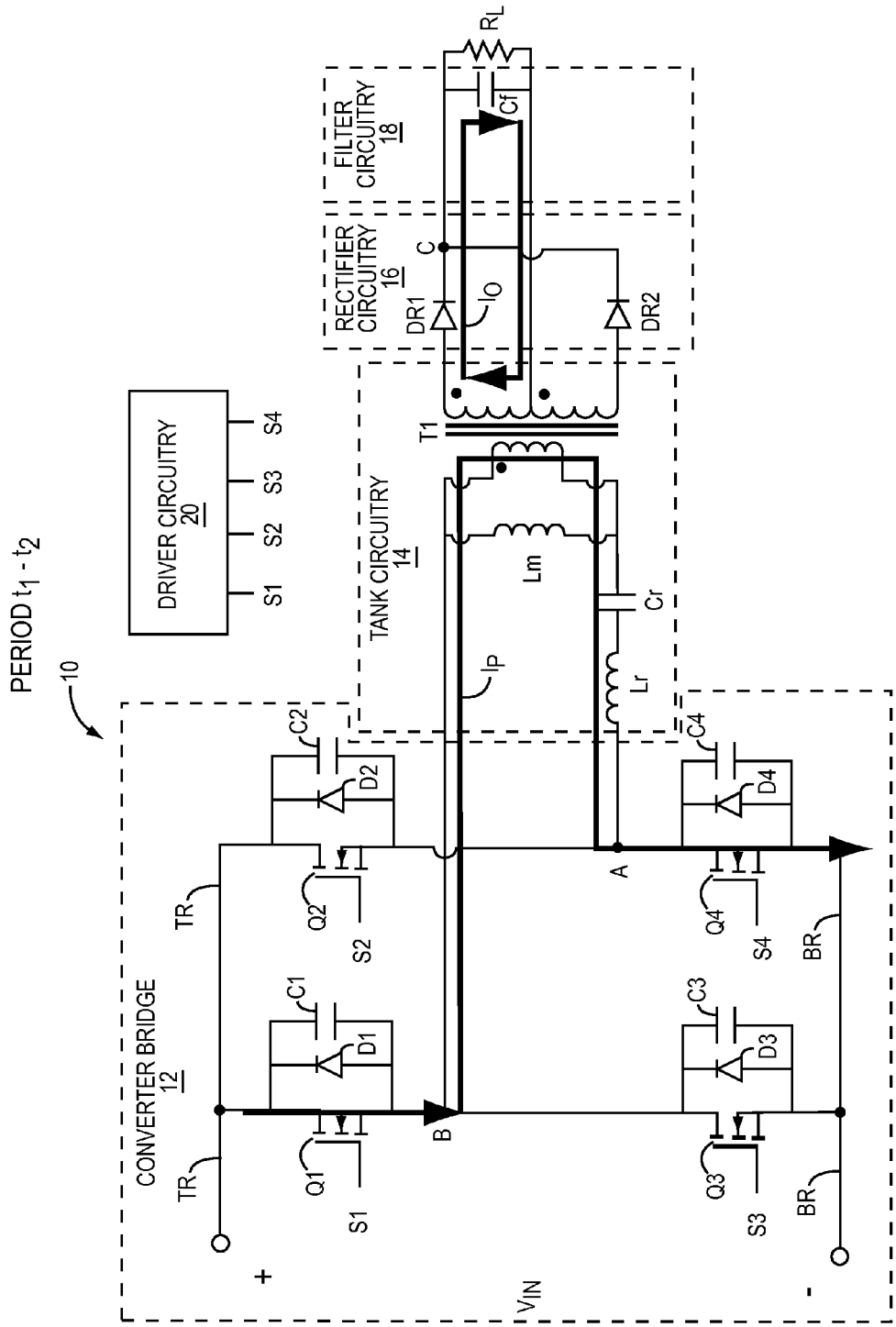

Reference is now made to FIGS. 2 and 3D. At time t1, the resonant inductor current ILr will go to zero and allow the primary current $I_P$ to reverse direction. As such, the primary current will flow in a forward (or normal direction) through the channels of the transistors Q1, Q4. The primary current $I_P$ will flow from the top rail TR to the bottom rail BR through the channel of transistor Q1, node B, the primary coil of transformer T1, the resonant capacitor Cr, the resonant inductor Lr, node A, and the channel of transistor Q4.

While the resonant inductor current ILr remains above the magnetizing current ILm, the output current $I_O$ continues to flow from the top coil of the transformer T1 through diode DR1 to the load $R_L$.

Figure 3E:
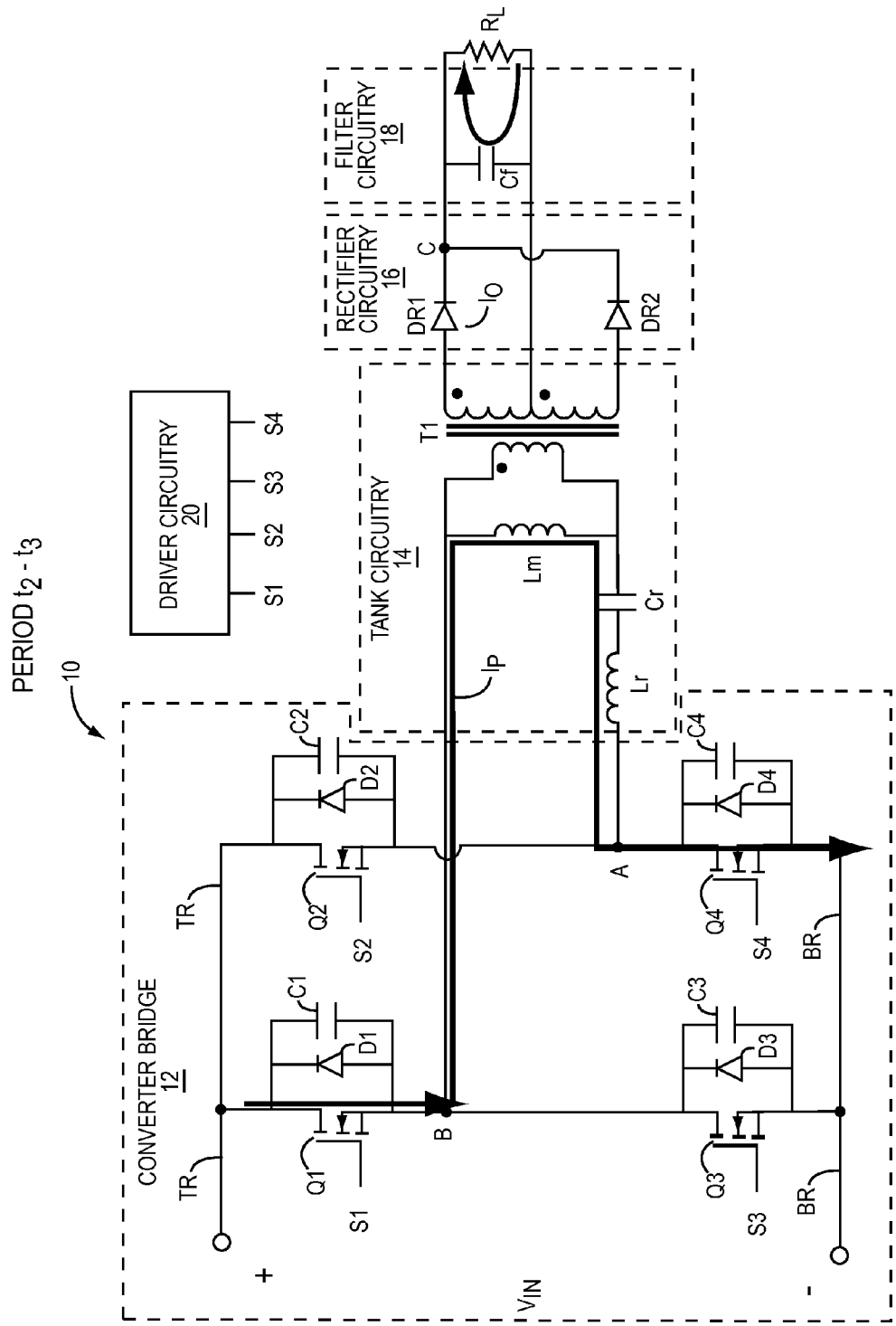
Figure 3F:
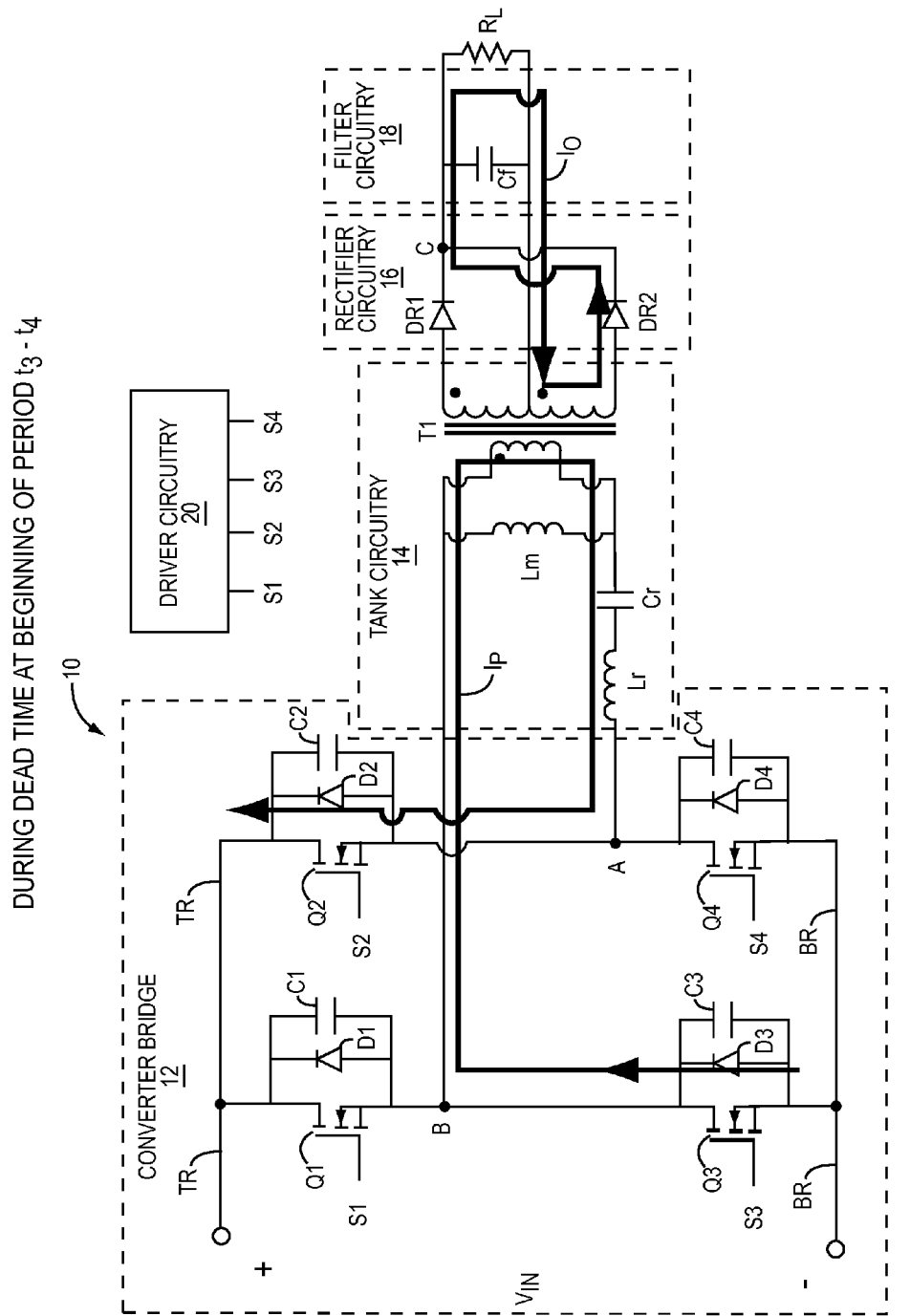
Figure 3G:
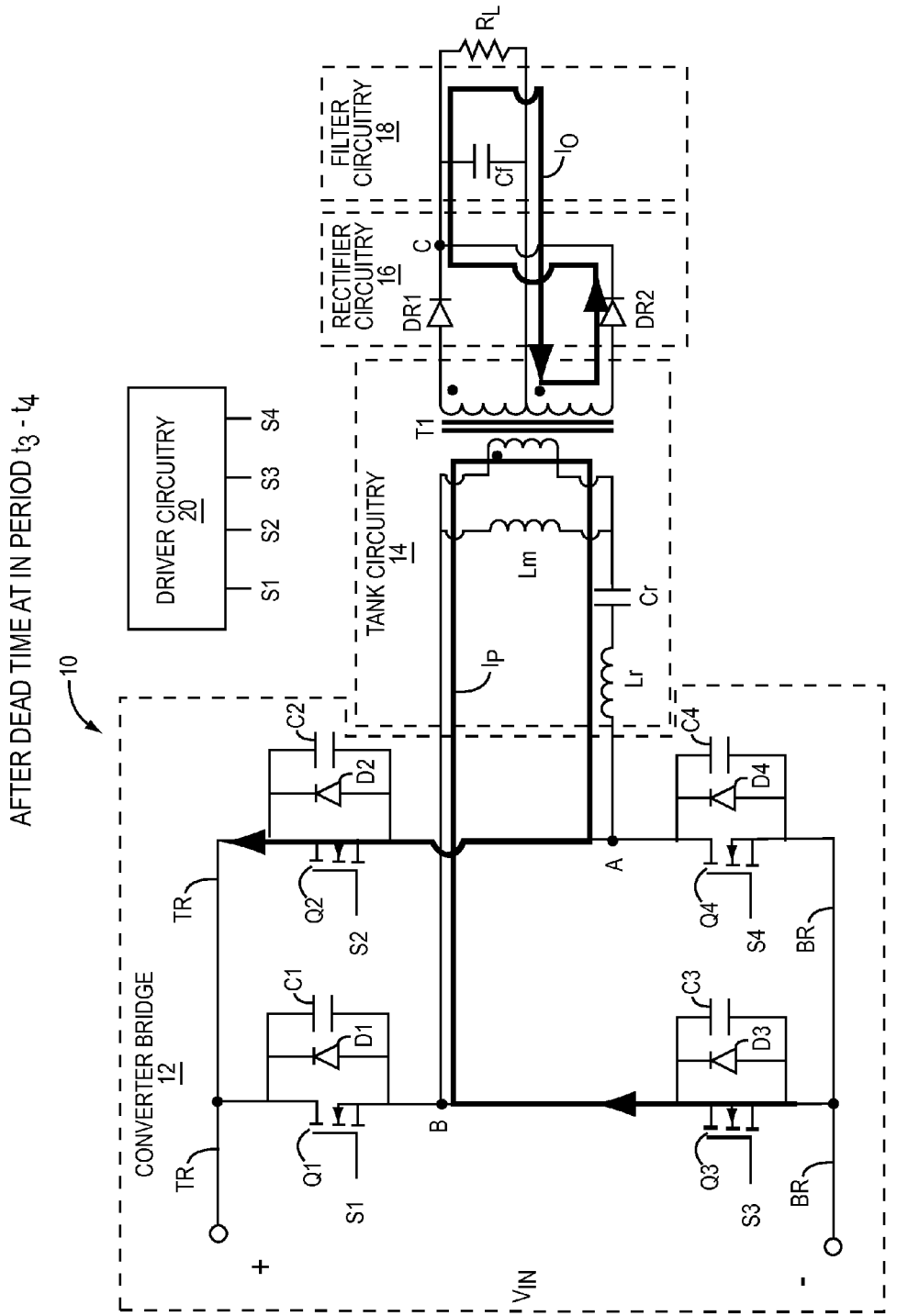
Figure 3H:
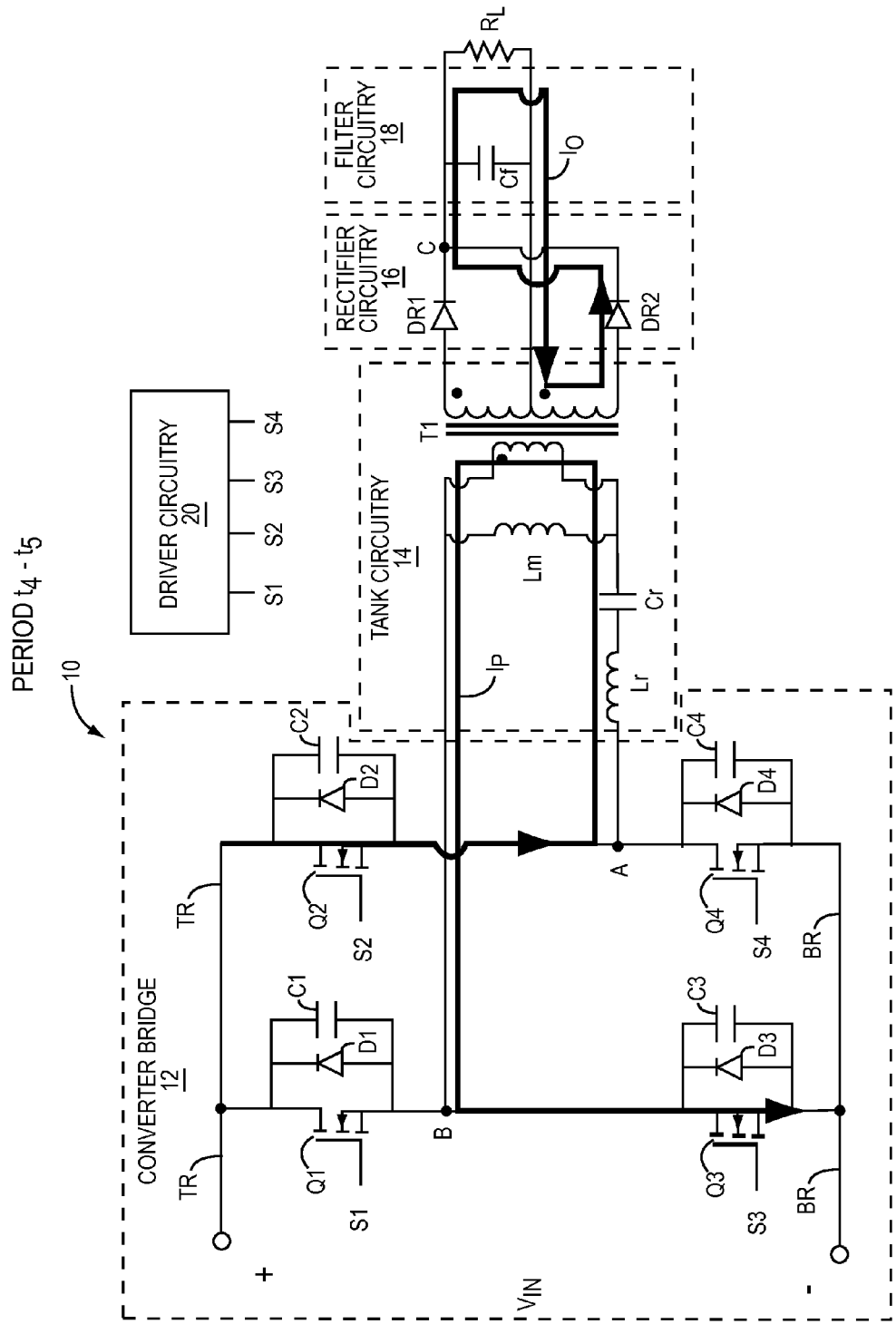
Figure 3I:
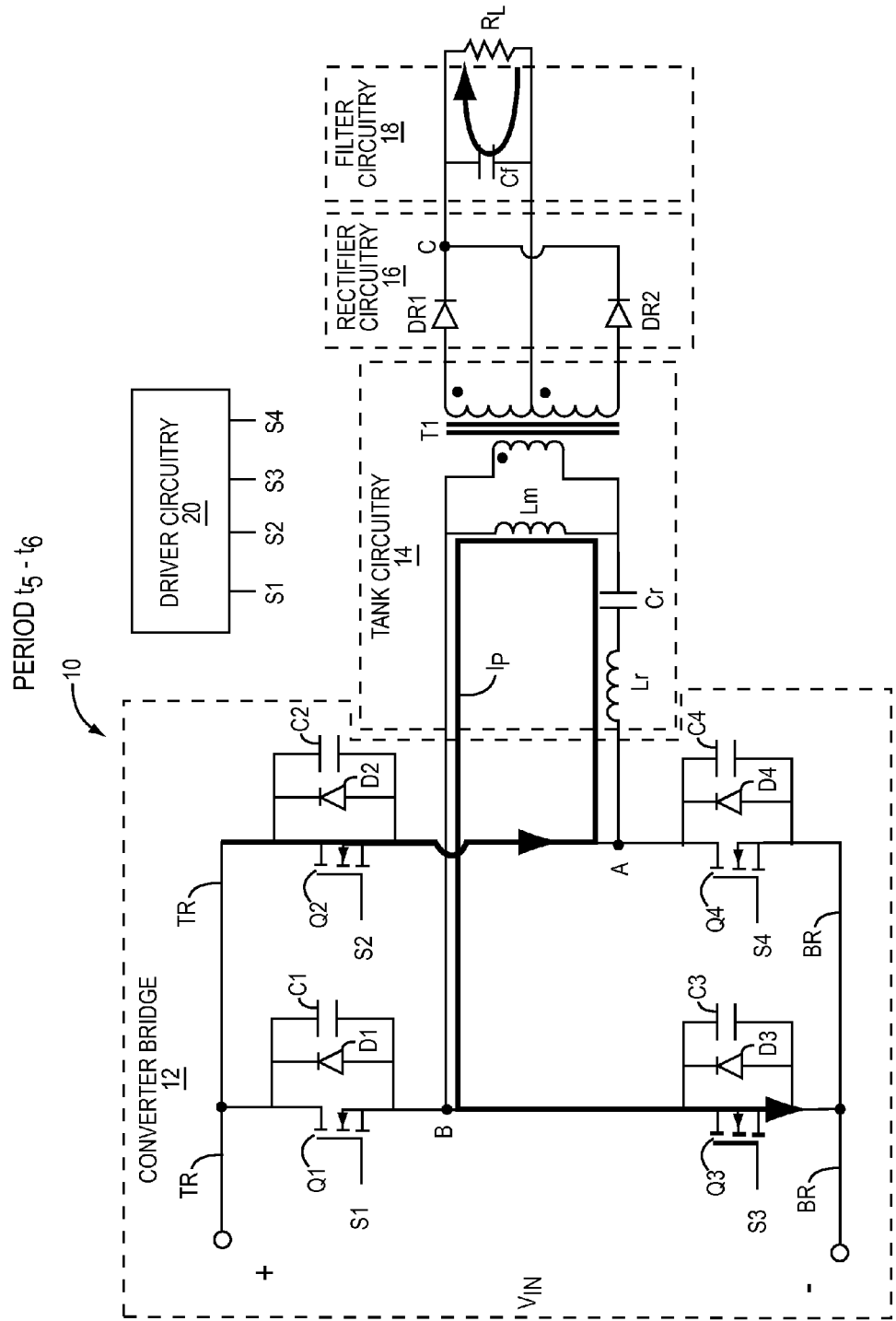

Reference is now made to FIGS. 2 and 3E. At time t2, the resonant current ILr will drop to a level that equals the magnetizing current ILm. When the resonant current ILr equals the magnetizing current ILm, the output current $I_O$ will drop to zero, and thus, current no longer flows through diode DR1. During this time and until time t3, the current to the load $R_L$ is provided by the capacitor Cf.

During the period t2-t3, the magnetizing inductance Lm, the resonant inductor Lr, and the resonant capacitor Cr resonate to discharge capacitors C2, C3 and charge capacitors C1, C4 for the upcoming negative half-cycle. Notably, the inductance of the magnetizing inductance Lm is much larger than that of the resonant inductor Lr. As such, the magnetizing inductance Lm effectively acts like a constant current source and functions to keep the primary current $I_P$ flowing in the same direction and at the same general level throughout period t2-t3 until the transistors Q1, Q4 are turned off at time t3. The primary current $I_P$ will flow from the top rail TR to the bottom rail BR through the channel of transistor Q1, node B, the magnetizing inductance Lm of transformer T1, the resonant capacitor Cr, the resonant inductor Lr, node A, and the channel of transistor Q4.

The negative half-cycle works in a symmetrical manner to the positive half-cycle. Reference is made to FIGS. 2 and 3F through 3I for illustration. For the sake of conciseness, an extended analysis like that provided for the positive half-cycle is not provided for the negative half-cycle, given the exact symmetry of operation of the positive and negative half-cycles.

The concepts above may be applied to different converter architectures, which use 2-level or higher configurations, and will result in uniquely small and efficient designs that are capable of operating at switching frequencies much higher than those of silicon-based counterparts. For example, the use of silicon carbide components allows a 2-level converter architecture to have a sustained output power of 5 kilowatts to 20 kilowatts, an input voltage of 650 V to 850 V, an overall efficiency rating between 97.5 and 99.0 percent, and a power density between 35 and 45 watts per cubic inch (including the volume of all components and the PCB, or PCBs if multiple PCBs are used). One of the reasons that the power density is so much improved over silicon-based converter architectures is that the concepts disclosed herein allow the operating, or switching, frequency of the ZVS converter 10 to be much higher. Higher operating frequencies require a higher resonant frequency for the tank circuitry 14, and allow smaller values, and thus sizes, for these resonant components (Lr, Lm, and Cr).

In the disclosed and other embodiments, when using silicon carbide components, the resonant frequency of the tank circuitry 14 may range from 225 kilohertz to 500 kilohertz when providing an output power over 5 kilowatts and an input voltage of greater than 650 V while maintaining an overall efficiency of greater than 97.5 percent. The resonant frequency is primarily defined by the values of the magnetizing inductance Lm, the inductance of the resonant inductor Lr, and the capacitance of the resonant capacitor Cr. In contrast, a silicon-based architecture operating at these power levels may only be able to support a resonant frequency in the range of 75 kilohertz to 150 kilohertz. The higher resonant frequency allows these resonant components (Lm, Lr, Cr) to have much smaller values, and thus be much smaller in size.

As such, a first set of parameters may define a 2-level converter architecture that provides a sustained output power of 5 kilowatts to 20 kilowatts, an input voltage of 650 V to 850 V, an overall efficiency rating between 97.5 and 99.0 percent, a power density between 35 and 45 watts per cubic inch, and a resonant frequency for the tank circuitry 14 between 225 kilohertz and 500 kilohertz. A second set of parameters may define a 2-level converter architecture that provides a sustained output power of 5 kilowatts to 10 kilowatts, an input voltage of 650 V to 800 V, an overall efficiency rating between 98.0 and 99.0 percent, a power density between 35 and 45 watts per cubic inch, and a resonant frequency for the tank circuitry 14 between 250 kilohertz and 450 kilohertz. A third set of parameters may define a 2-level converter architecture that provides a sustained output power greater than 5 kilowatts, an input voltage greater than 650 V, an overall efficiency rating greater than 97.5 percent, a power density greater than 35 watts per cubic inch, and a resonant frequency for the tank circuitry 14 greater than 225 kilohertz. These are three exemplary combinations, wherein any combination of the listed parameters is possible. Further, not all of the parameters need to apply in all applications to fall within the scope of the claims.

Figure 4:
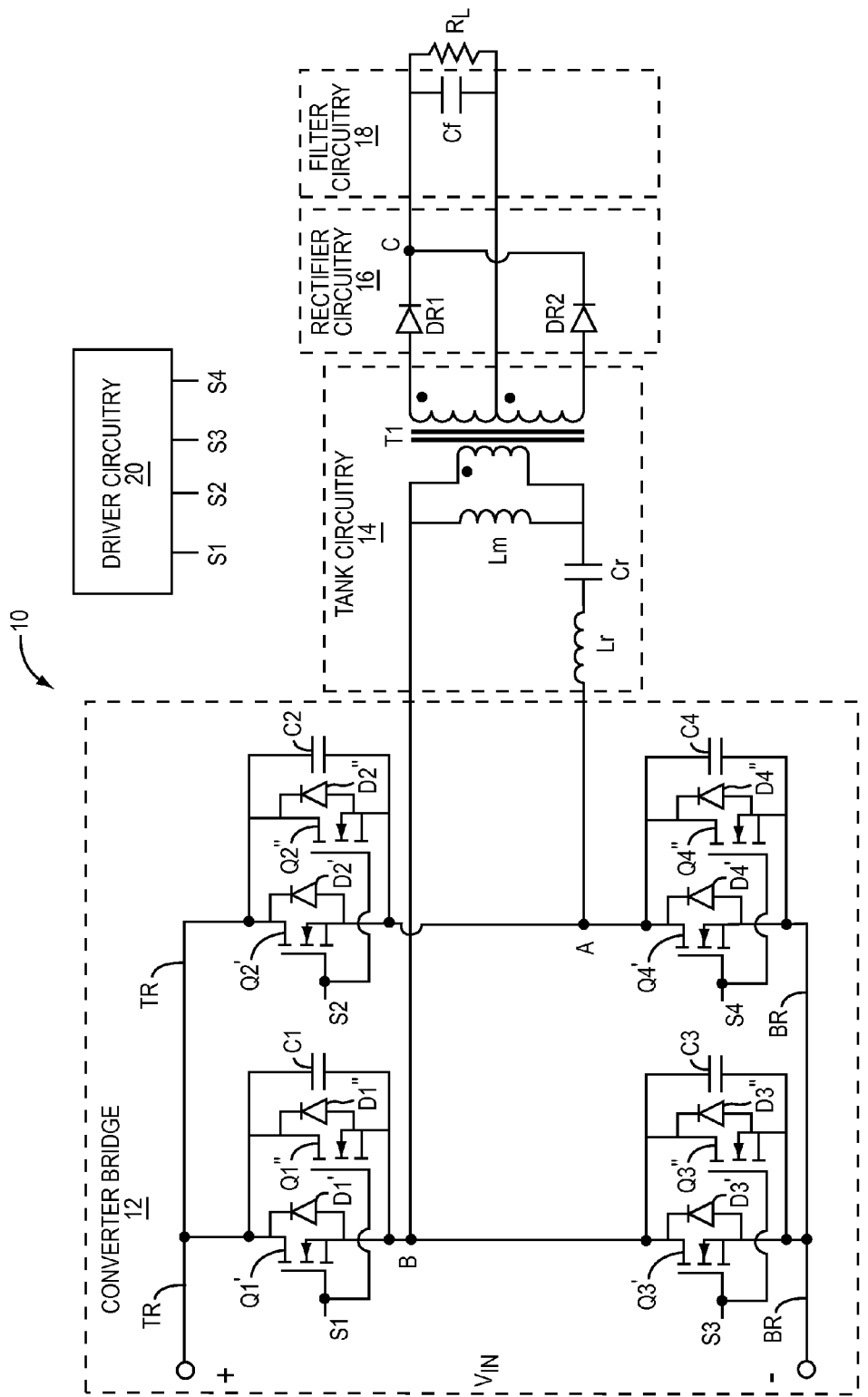
FIG. 4 illustrates an alternative schematic diagram for the ZVS converter according to a second embodiment.

Turning now to FIG. 4, an alternative embodiment is shown. In this environment, the ZVS converter 10 is modified such that each of the four switch circuits is configured with parallel transistors, and in particular, parallel MOSFETs. The first switch circuit, which resides at the top of the left shunt leg, includes parallel MOSFETs Q1', Q1". The respective gates, drains, and sources of MOSFETs Q1', Q1" are directly coupled to one another. Each of the MOSFETs Q1', Q1" will include body diodes D1', D1". One or more capacitors C1 may be provided across the drains and sources of the MOSFETs Q1', Q1".

Similarly, the second switch circuit, which resides in the top of the right shunt leg, includes parallel MOSFETs Q2', Q2". The respective gates, drains, and sources of MOSFETs Q2', Q2" are directly coupled to one another. Each of the MOSFETs Q2', Q2" will include body diodes D2', D2". One or more capacitors C2 may be provided across the drains and sources of the MOSFETs Q2', Q2". The third switch circuit, which resides in the bottom of the left shunt leg, includes parallel MOSFETs Q3', Q3". The respective gates, drains, and sources of MOSFETs Q3', Q3" are directly coupled to one another. Each of the MOSFETs Q3', Q3" will include body diodes D3', D3". One or more capacitors C3 may be provided across the drains and sources of the MOSFETs Q3', Q3". The fourth switch circuit, which resides in the bottom of the right shunt leg, includes parallel MOSFETs Q4', Q4". The respective gates, drains, and sources of MOSFETs Q4', Q4" are directly coupled to one another. Each of the MOSFETs Q4', Q4" will include body diodes D4', D4". One or more capacitors C4 may be provided across the drains and sources of the MOSFETs Q4', Q4". By employing parallel transistors in the switch circuits, the power handling of the ZVS converter 10 may be increased.

Figure 5:
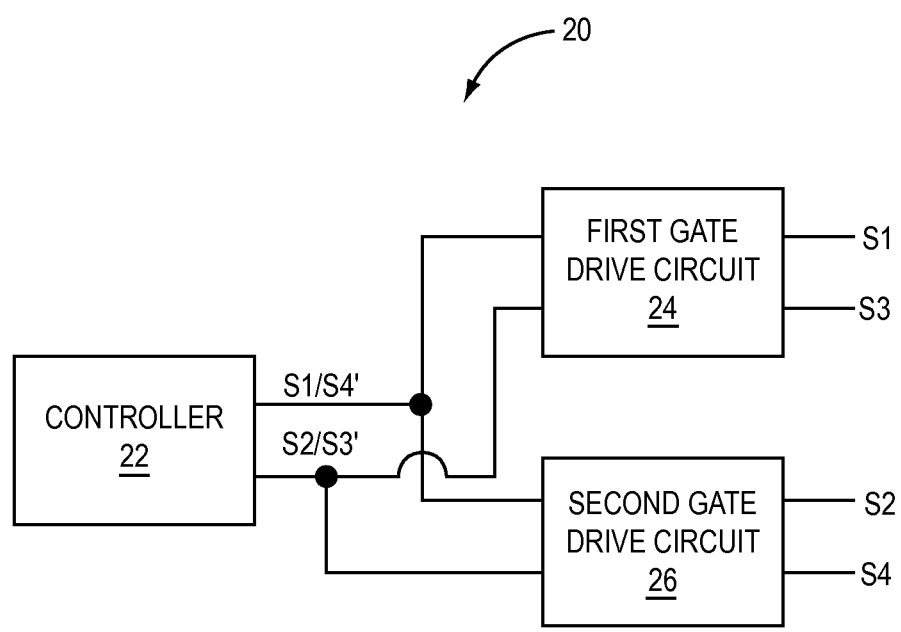
FIG. 5 is a block diagram of the driver circuitry for the ZVS converter of FIG. 1 according to one embodiment.

In one embodiment, the driver circuitry 20 will include an analog or digital controller 22, the first gate drive circuit 24, and a second gate drive circuit 26, as shown in FIG. 5. The controller 22 will output two input signals, which are referenced as S1/S4' and S2/S3', respectively. Logically, these signals will be the complement of the S1/S4 and S2/S3 transistor states shown in FIG. 2. Each of the two input signals S1/S4', S2/S3' will be provided to both the first gate drive circuit 24 and the second gate drive circuit 26. The first gate drive circuit 24 will process the input signals S1/S4' and S2/S3' and provide control signals S1, S3, which are used to drive the respective top and bottom switch circuits in the left shunt leg. The second gate drive circuit 26 will process the input signals S1/S4' and S2/S3' and provide control signals S2, S4, which are used to drive the respective top and bottom switch circuits in the right shunt leg.

Figure 6:
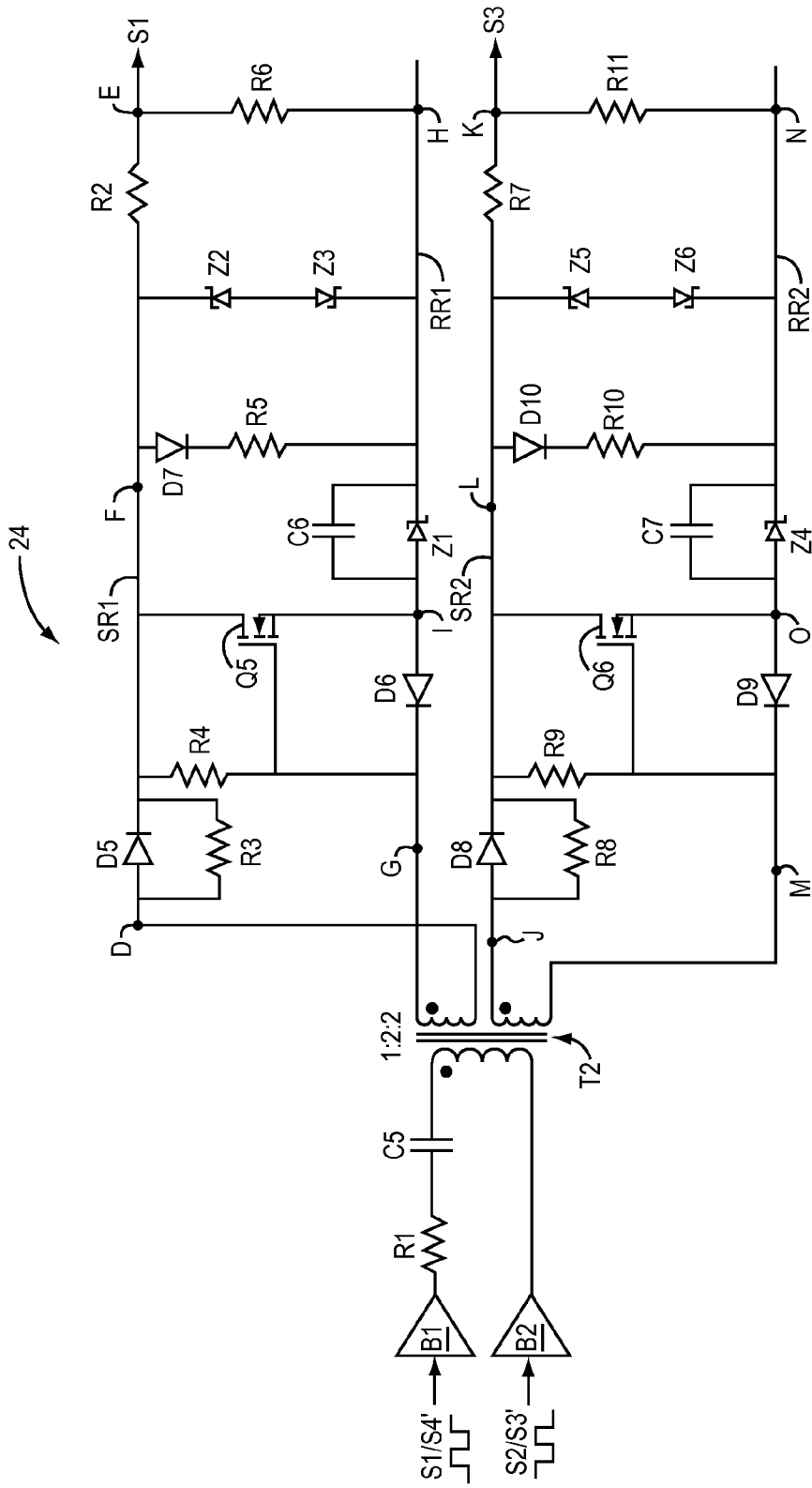
FIG. 6 is a schematic diagram of one of two gate drive circuits of the driver circuitry according to one embodiment.

FIG. 6 illustrates an exemplary schematic for the first gate drive circuit 24. The second gate drive circuit 26 is configured in an analogous fashion. The goal of the first and second gate drive circuits 24, 26 is to provide control signals S1-S4, such that a relatively high turn-on voltage is provided to the respective gates to quickly turn on the corresponding transistors Q1-Q4 and negative turnoff voltage is provided to the respective gates to quickly turn off the corresponding transistors Q1-Q4. In this example, the turn-on voltage is approximately 20 V, and the turn-off voltage is initially −2.4 V before transitioning to or toward 0 V. Those skilled in the art will recognize other voltage levels for both the positive turn-on and negative turn-off voltages.

As illustrated, the first gate drive circuit 24 includes two buffer circuits B1, B2, which drive the respective terminals of a primary coil for a transformer T2. In particular, input signal S1/S4' is coupled to the top terminal of the primary coil through series connected buffer B1, resistor R1, and capacitor C5. Input signal S2/S3' is coupled to the bottom terminal of the primary coil. The input signals S1/S4' and S2/S3' are configured such that states S1/S4 are both low during the dead time at the beginning of the period t0-t1. Input signals S1/S4' and S2/S3' are further configured such that states S1/S4 are complementary to each other for the remaining times, such that state S1/S4 is the complement of state S2/S3 at all times other than the dead times.

The transformer T2 has two secondary coils, which feed independent top and bottom circuits, respectively. The top circuit will provide the control signal S1, and the bottom circuit will provide the control signal S3. The top and bottom circuits are identical; however, the secondary coils are connected to the top and bottom circuits with opposite polarity. This will ensure that control signals S1, S3 are never high at the same time and are logically opposite one another for all times, other than the dead time, when input signals S1/S4' and S2/S3' are at the same level.

The top circuit has a signal rail SR1 and a return rail RR1. The signal rail SR1 is coupled between node D, which corresponds to the bottom terminal of the top secondary coil of transformer T2, and node E, which outputs the control signal S1. The signal rail SR1 includes series connected diode D5 and resistor R2, wherein node F resides between the diode D5 and the resistor R2. A resistor R3 is coupled across the diode D5. The return rail RR1 is coupled between nodes G and H. Diode D6 and Zener diode Z1 are connected in series along the return rail RR1, such that the anodes of the diode D6 and the Zener diode Z1 are coupled together at node I. Capacitor C6 is coupled across the Zener diode Z1.

Transistor Q5, which may be an N-channel MOSFET or NPN bipolar transistor, is coupled between nodes F and I, wherein the gate is coupled to node G. Resistor R4 is coupled between node F and the gate of transistor Q5. Two shunt circuits are coupled between node F and node H. The first shunt circuit includes series connected diode D7 and resistor R5, wherein the anode of diode D7 is coupled to node F. The second shunt circuit includes two series connected Zener diodes Z2, Z3, which are connected in a blocking manner. As such, the anodes of the Zener diodes Z2, Z3 are coupled together, the cathode of Zener diode Z2 is coupled to node F, and the cathode of Zener diode Z3 is coupled to node H. Resistor R6 is coupled between nodes E and H.

The bottom circuit has a signal rail SR2 and a return rail RR2. The signal rail SR2 is coupled between node J, which corresponds to the top terminal of the bottom secondary coil of transformer T2, and node K, which outputs the control signal S3. The signal rail SR2 includes series connected diode D8 and resistor R7, wherein node L resides between the diode D8 and the resistor R7. A resistor R8 is coupled across the diode D8. The return rail RR2 is coupled between nodes M and N. Diode D9 and Zener diode Z4 are connected in series along the return rail RR2, such that the anodes of the diode D9 and the Zener diode Z4 are coupled together at node O. Capacitor C7 is coupled across the Zener diode Z4.

Transistor Q6, which may be an N-channel MOSFET or NPN bipolar transistor, is coupled between nodes L and O, wherein the gate is coupled to node M. Resistor R9 is coupled between node L and the gate of transistor Q6. Two shunt circuits are coupled between node L and node N. The first shunt circuit includes series connected diode D10 and resistor R10, wherein the anode of diode D10 is coupled to node L. The second shunt circuit includes two series connected Zener diodes Z5, Z6, which are connected in a blocking manner. As such, the anodes of the Zener diodes Z5, Z6 are coupled together, the cathode of Zener diode Z5 is coupled to node L, and the cathode of Zener diode Z6 is coupled to node N. Resistor R11 is coupled between nodes K and N.

In one embodiment, the semiconductor devices in the first and second gate drive circuits 24, 26 are silicon-based, while the semiconductor devices in the ZVS converter 10 are silicon carbide-based devices. Those skilled in the art will appreciate that other material systems are available for these semiconductor devices.

From a single DC power supply, the first gate drive circuit 24 is able to generate control signals S1 and S3, such that the turn-on voltage is 20 V (the silicon carbide MOSFET recommended turn-on voltage) and the turn-off voltage is generally constant at −2.4 V before transitioning to or toward 0 V at the dead time. The negative turn-off voltage helps to quickly turn off the silicon carbide MOSFETs, and reduces the possibility of noise causing the MOSFTET to errantly turn on during the off state. The transformer T2 is configured to provide a 24 V signal across both secondary coils when the input signals S1/S4', S2/S3' are in complementary states. These voltages are merely exemplary, wherein the disclosed concepts provide a positive turn-on voltage and a negative turn-off voltage from a single DC power supply. Further, the turn-on voltage may be greater than that provided by the DC power supply.

Figure 7A:
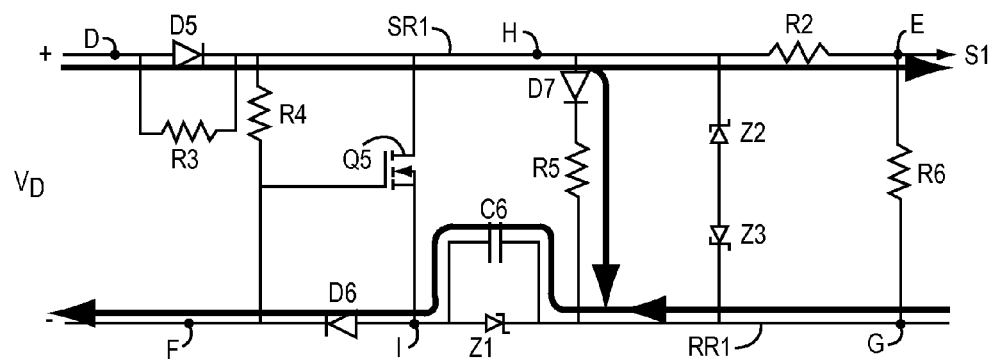
FIGS. 7A and 7B illustrate current flow through one part of a gate drive circuit according to one embodiment.
Figure 7B:
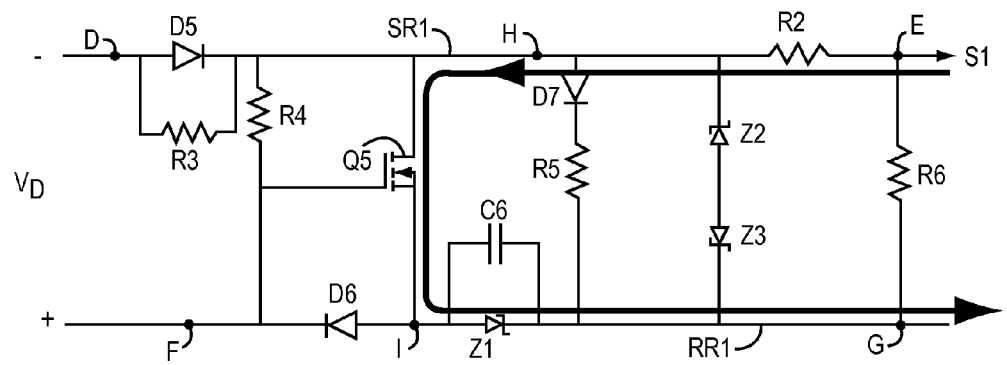

With reference now to FIGS. 7A and 7B, the two input voltages $V_D$ and corresponding current paths in the top circuit of the first gate drive circuit 24 are shown for the two corresponding turn-on and turn-off voltages for control signal S1. Again, the input voltage $V_D$ is the voltage across the secondary coil of transformer T2. The bottom circuit of the first gate drive circuit 24 and both the top and bottom circuits of the second gate drive circuit 26 operate in the same fashion.

For the turn-on state, reference is made to FIG. 7A. When the input voltage $V_D$ is positive across nodes D and F, transistor Q5 is off, and diodes D5, D6, and D7 are forward biased. As such, current flows through node D, diode D5, to node H where it splits into two branches. The first branch flows through resistor R2 to node E and represents the control signal S1.

The second branch flows through diode D7, resistor R5, capacitor C6, node I, diode D6, to node F. When current flows in this direction in the second branch, capacitor C6 is charged. The charge across capacitor C6 is limited to 2.4 V by the Zener diode Z1. The charge across capacitor C6 is used in the subsequent turn-off state to generate the −2.4 V turn-off voltage.

When the input voltage $V_D$ changes polarity, as shown in FIG. 7B, transistor Q5 turns on to help with a fast turn-off and diode D6 blocks current flow to the winding of T2. Current flows through node E, resistor R2, node H, transistor Q5, node I, and Zener diode Z1, to node G. When the current flows in this direction, capacitor C6 acts like a voltage source to generate the −2.4 V bias for control signal S1.

Those skilled in the art will recognize improvements and modifications to the preferred embodiments of the present disclosure. All such improvements and modifications are considered within the scope of the concepts disclosed herein and the claims that follow.

What is claimed is:
1. A DC-DC converter comprising:
    a converter bridge comprising a plurality of switch circuits configured to provide a primary current and comprising silicon carbide metal-oxide-semiconductor field-effect transistors (MOSFETs);
    tank circuitry comprising a resonant capacitance, a resonant inductance, and a transformer with a primary, a first secondary and a second secondary and configured to receive the primary current wherein the transformer is associated with a magnetizing inductance and a resonant frequency of the tank circuitry is greater than about 225 kilohertz as essentially defined by the magnetizing inductance, the resonant capacitance, and the resonant inductance; and
    rectifier circuitry coupled to the first secondary and the second secondary and adapted to provide a rectified output current.
2. The DC-DC converter of claim 1 wherein the resonant frequency is between about 225 kilohertz and 500 kilohertz.
3. The DC-DC converter of claim 1 wherein the resonant frequency is between about 250 kilohertz and 450 kilohertz.
4. The DC-DC converter of claim 1 wherein the converter bridge employs a 2-level architecture.
5. The DC-DC converter of claim 1 wherein the plurality of switch circuits comprises four switch circuits, which are arranged in an H-bridge configuration.
6. The DC-DC converter of claim 1 wherein each of the plurality of switch circuits comprises parallel silicon carbide MOSFETs.
7. The DC-DC converter of claim 1 further comprising driver circuitry configured to control the plurality of switch circuits to provide zero voltage switching.
8. The DC-DC converter of claim 7 wherein the driver circuitry is further configured to provide a first dead time at a beginning of each positive half-cycle and a second dead time at a beginning of each negative half-cycle, the first and second dead times provided when each of the plurality of switch circuits is off.
9. The DC-DC converter of claim 8 wherein the driver circuitry is further configured to control the plurality of switch circuits such that:
    during the positive half-cycle, a first pair of the plurality of switch circuits is off and a second pair of the plurality of switch circuits is on after the first dead time; and during the negative half-cycle, the second pair of the plurality of switch circuits is off and the first pair of the plurality of switch circuits is on after the second dead time.

10. The DC-DC converter of claim 9 wherein the driver circuitry is configured to turn the plurality of switch circuits on with a positive voltage and turn the plurality of switch circuits off with a negative voltage, the positive and negative voltages derived exclusively from a single positive voltage.

11. The DC-DC converter of claim 7 wherein the driver circuitry is configured to turn the plurality of switch circuits on with a positive voltage and turn the plurality of switch circuits off with a negative voltage, the positive and negative voltages derived exclusively from a single positive voltage.

12. The DC-DC converter of claim 1 further comprising filter circuitry and at least one printed circuit board (PCB) on which the converter bridge, the tank circuitry, and the rectifier circuitry are provided, wherein:
    the PCB, the converter bridge, the tank circuitry, the rectifier circuitry, and the filter circuitry have a combined volume; and
    the DC-DC converter can sustain a power output at a level that provides a power density of greater than about 35 watts per cubic inch.

13. The DC-DC converter of claim 12 wherein the DC-DC converter can sustain a power output at a level that provides a power density of between about 35 and 45 watts per cubic inch.

14. The DC-DC converter of claim 13 further comprising fan circuitry, which includes a fan, wherein the power density includes a volume of the fan circuitry.

15. The DC-DC converter of claim 1 wherein an output power provided by the DC-DC converter exceeds about five kilowatts at an input voltage of greater than about 650 volts.

16. The DC-DC converter of claim 15 wherein an efficiency of the DC-DC converter exceeds 97.5%.

17. The DC-DC converter of claim 1 wherein an output power provided by the DC-DC converter is between about five kilowatts and 20 kilowatts at an input voltage of between about 650 and 850 volts.

18. The DC-DC converter of claim 17 wherein an efficiency of the DC-DC converter is between about 97.5% and 99.0%.

19. The DC-DC converter of claim 18 wherein the converter bridge employs a 2-level architecture.

20. The DC-DC converter of claim 19 wherein the resonant frequency is between about 225 kilohertz and 500 kilohertz.

21. The DC-DC converter of claim 20 further comprising filter circuitry and at least one printed circuit board (PCB) on which the converter bridge, the tank circuitry, and the rectifier circuitry are provided, wherein:
    the PCB, the converter bridge, the tank circuitry, the rectifier circuitry, and the filter circuitry have a combined volume; and
    the DC-DC converter can sustain a power output at a level that provides a power density between about 35 and 45 watts per cubic inch.

22. The DC-DC converter of claim 21 further comprising fan circuitry, which includes a fan, wherein the power density includes a volume of the fan circuitry.

23. A DC-DC converter comprising:
    a 2-level converter bridge comprising a plurality of switch circuits adapted to provide a primary current and comprising silicon carbide metal-oxide-semiconductor field-effect transistors (MOSFETs);
    tank circuitry comprising a resonant capacitance, a resonant inductance, and a transformer with a primary, a first secondary and a second secondary and configured to receive the primary current wherein the transformer is associated with a magnetizing inductance and a resonant frequency of the tank circuitry is between about 250 kilohertz and 450 kilohertz as essentially defined by the magnetizing inductance, the resonant capacitance, and the resonant inductance; and
    rectifier circuitry coupled to the first secondary and the second secondary and adapted to provide a rectified output current, wherein:
        an output power provided by the DC-DC converter is between about five kilowatts and 20 kilowatts at an input voltage of between about 650 and 850 volts; and
        an efficiency of the DC-DC converter is between about 97.5% and 99.0%.

24. A DC-DC converter comprising silicon carbide metal-oxide-semiconductor field-effect transistors (MOSFETs) in a plurality of switching circuits arranged in a 2-level architecture, wherein the DC-DC converter has a resonant frequency of between about 225 kilohertz and 500 kilohertz, an output power between about five kilowatts and 20 kilowatts at an input voltage of between about 650 and 850 volts; and an efficiency between about 97.5% and 99.0%.

25. The DC-DC converter of claim 24 wherein the DC-DC converter has a power density between about 35 and 45 watts per cubic inch.

* * * * *

UNITED STATES PATENT AND TRADEMARK OFFICE
CERTIFICATE OF CORRECTION

PATENT NO.         : 9,461,547 B2
APPLICATION NO.    : 14/201005
DATED              : October 4, 2016
INVENTOR(S)        : XueChao Liu and John Mookken Page 1 of 1

It is certified that error appears in the above-identified patent and that said Letters Patent is hereby corrected as shown below:

In the Specification

In Column 5, Line 45, replace "primary current $I_F$" with --primary current $I_P$--.

Signed and Sealed this
Tenth Day of January, 2017

Michelle K. Lee
*Director of the United States Patent and Trademark Office*